United States Patent
Diehl et al.

[11] Patent Number: 5,930,517
[45] Date of Patent: Jul. 27, 1999

[54] DATA PROCESSING SYSTEM WITH SEPARABLE SYSTEM UNITS

[75] Inventors: Thorsten Diehl, Holzgerlingen; Rainer Dietrich, Sindelfingen, both of Germany

[73] Assignee: International Business Machines Corporation, Armonk, N.Y.

[21] Appl. No.: 08/673,866

[22] Filed: Jul. 2, 1996

[30] Foreign Application Priority Data

Aug. 11, 1995 [DE] Germany ............ 195 29 588

[51] Int. Cl.$^6$ .................. G06F 1/26; G06F 1/32
[52] U.S. Cl. ................... 395/750.08; 395/283
[58] Field of Search .................... 395/750, 750.08, 395/750.03, 750.01, 283; 364/707, 708

[56] References Cited

U.S. PATENT DOCUMENTS

| | | | |
|---|---|---|---|
| 4,203,153 | 5/1980 | Boyd | 395/750 |
| 4,435,761 | 3/1984 | Kimoto | 395/750 |
| 5,115,182 | 5/1992 | Ehmke et al. | 320/14 |
| 5,265,238 | 11/1993 | Canova, Jr. et al. | 395/500 |
| 5,339,446 | 8/1994 | Yamasaki et al. | 395/750 |
| 5,343,319 | 8/1994 | Moore | 359/152 |
| 5,345,392 | 9/1994 | Mito et al. | 364/483 |
| 5,365,221 | 11/1994 | Fennell et al. | 340/636 |
| 5,394,552 | 2/1995 | Shirota | 395/750 |
| 5,408,423 | 4/1995 | Kawagishi | 364/707 |
| 5,442,794 | 8/1995 | Wisor et al. | 395/750 |
| 5,451,933 | 9/1995 | Stricklin et al. | 340/825.06 |
| 5,463,261 | 10/1995 | Skarda et al. | 307/131 |
| 5,619,396 | 4/1997 | Gee et al. | 361/686 |
| 5,664,118 | 9/1997 | Nishigaki et al. | 395/283 |

*Primary Examiner*—Glenn A. Auve
*Assistant Examiner*—Xuan M. Thai
*Attorney, Agent, or Firm*—Anthony N. Magistrale; Lisa Yociss; Andrew J. Dillon

[57] ABSTRACT

The invention relates to a data processing system with a first 1 and a second system unit 2, with a data transfer connector 4 provides a connection between the first and the second system unit, where the first system unit comprises an energy storage device 10 as a power supply and a monitor for monitoring a state of charge 11 of the energy storage device. The monitor is adapted to initialize the disconnection of the connection between the first and the second system unit when the state of charge falls below a threshold value.

13 Claims, 2 Drawing Sheets

DATA PROCESSING SYSTEM WITH SEPARABLE SYSTEM UNITS

BACKGROUND OF THE INVENTION

The invention relates to a data processing system with a first and a second system unit, which can be separated from one another. The invention further relates to a method for separating two system units of a data processing system.

From the state of the art it is known to provide a system unit of a data processing system with an energy store, e.g. a battery or a condenser, for buffering the power supply. For example, the energy store can serve for buffering for a short time if the mains supply fails.

For portable computers, batteries are generally used as energy stores, particularly for so-called notebook PCs, e.g. IBM THINKPAD Notebook. It is also possible to operate a portable computer in combination with an additional system unit in a static operation. The additional system unit is then generally a so-called docking station, e.g. IBM Dock II (cf. IBM ThinkPad Dock II, User Manual, IBM Part Number 13H1664 (84G9682)).

A Docking Station offers extended functions, so that by combining a portable computer with the docking station the functionality of the data processing system thus formed overall corresponds to the functionality of a stationary desk top computer system. It is particularly advantageous if the docking station permits so-called hot-docking and hot-undocking. Then the portable computer can be connected with and disconnected from the docking station during operation. It is then not necessary to switch off the portable computer when connecting and separating the system units and to restart the operating system again after connection. In particular the IBM Dock II docking station permits the hot-docking and hot-undocking of an IBM ThinkPad.

A docking station of the type mentioned is also known from U.S. Pat. No. 5,265,238. A power supply system for a portable computer with a charge sensor is known from U.S. Pat. No. 5,345,392.

Known docking stations are designed for stationary operation on the mains. For many applications, however, it is advantageous if not only the notebook PC but also the complete system of notebook PC and docking station is capable of operation independent of the mains.

SUMMARY OF THE INVENTION

This invention has as one purpose providing an improved data processing system of the type described. The invention has the further purpose of providing an improved process for separating a connection between the system units of a data processing system.

DESCRIPTION OF THE PREFERRED EMBODIMENT(S)

Figure 1:
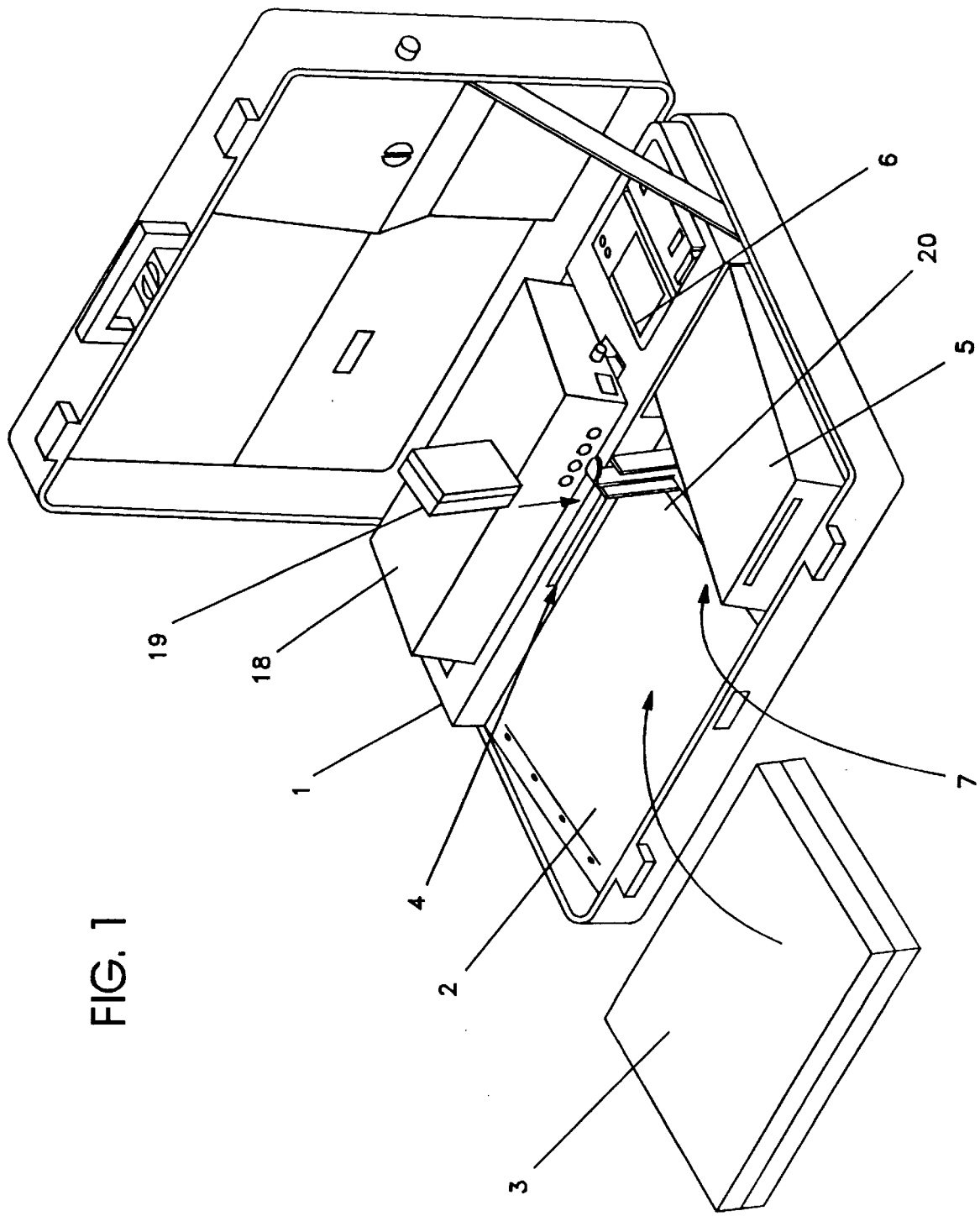
FIG. 1 is a perspective view of a docking station in accordance with the invention and a notebook PC.

The data processing system in accordance with the invention may be a stationary system. The energy store of the first system unit can then comprise, for example, a buffer condenser to buffer a limited time interruption of the mains supply. After an interruption of the electrical energy supply to the data processing system through the mains the power is then supplied from the buffer condenser. This is particularly important to insure data which, without this buffering, would be lost as a result of a sudden failure of the mains supply.

The data must be secured before the buffer condenser is completely discharged, i.e. so long as the data processing system is still operational. For this, the charge state of the buffer condenser is monitored. If the state of charge of the buffer condenser falls below a predetermined threshold value, little time will remain to secure the data. It is advantageous, before the complete discharge of the buffer condenser, to separate the second system unit of the data processing system from the first system unit, so that the second system unit can operate independently from the first system unit, e.g. by making use of a further energy store.

The disconnection of this connection between the first and the second system units is initiated on reaching the threshold value, e.g. by warning the user of the data processing system through the second system unit of the necessity to secure the data.

The invention is particularly advantageous for a portable data processing system. The first system unit can then be a portable docking station; the second system unit can be a portable computer, e.g. a notebook PC. More advantageously the docking station is in a case so that, on placing the notebook PC in the docking station, the whole data processing system comprising docking station and notebook PC is transportable in the case. The invention ensures that, inter alia, work can be continued on the notebook PC if the energy of the docking station is used up.

The means for monitoring a state of charge of the energy store of the first system unit can consist of a charge sensor or a voltage sensor. If it is found that the charge falls below the predetermined threshold value, the means for monitoring a charge state will initialize the disconnection of the connection between the first and the second system units, in the example between the docking station and the notebook PC. The initialization can be effected by the means for monitoring a charge state issuing a signal which is conveyed to the second unit, e.g. the notebook PC, when the charge falls below the predetermined threshold value.

The receipt of this signal in the second system unit will advantageously result in the second system unit advising the user of the data processing system of the need to secure the data. In this way it is possible to ensure that the work which has been started can be completed properly and the data stored e.g. on the hard disk of the first system unit, before the first unit finally fails.

The second system unit can typically be independent of the docking station in respect of power supply. This is the case, in particular, if the second system unit has a separate energy store available. This applies particularly to notebook PCs with an in-built rechargeable battery. If the charge state falls below the threshold value of the battery of the first system unit, there is a danger that this data belonging to the first system unit will be lost, if it is not secured before the battery of the first system unit is completely exhausted.

This case is likely to arise if a text processing program is running on the second system unit and the text file open at the time is stored on a hard disk on the first system unit. In order to avoid the loss of unstored text, it is necessary for the text file to be closed before the complete exhaustion of the battery of the first system unit. The controlled closure of the text file before the breakdown of the power supply of the first system unit is made possible by displaying the relevant requirement to the user.

After the closure of the text file the first and the second system units can logically be separated from one another. The logical disconnection of the first from the second system unit can be carried out by disconnecting the data transfer cable between the two units. After disconnection and, if necessary, switching off the docking station, it is possible to continue working independently on the notebook PC.

In accordance with a further preferred embodiment of the invention, the first system unit can be a mobile data transfer unit, e.g. a so-called Handy, which can also act as a telefax device. If it is found that the charge state in the data transfer device falls below the threshold value, an appropriate signal is sent to the second system unit, e.g. to a notebook PC, to which the data transfer device is connected. This signal received by the notebook PC results in the user of the notebook PC receiving a message on his screen indicating that the data transfer device will only remain available for operation for a limited period. Any data transfer which is running from the notebook PC to the data transfer device at the time can then be terminated.

On completion of the data transfer the user can then effect disconnection of the two system units. A logical disconnection of the connection between the system units can also be effected automatically by one of the system units. This will avoid the possibility that during further data transfers the charge level in the Handy will drop so far that the Handy is no longer functional so that part of the data to be transmitted is not received by the recipient.

The docking station 1 shown in FIG. 1 has a base 2 to accept a notebook PC 3. The docking station 1 further has a computer connector 4 through which a connection can be established between the docking station 1 and the notebook PC 3. The docking station 1 permits various functional expansions. FIG. 1 shows only a storage unit 5, a printer 18 and a PCMCIA card 19. The storage unit 5 takes the form of a hard disk drive. The PCMCIA card 19 is inserted in the slot 20 in the docking station.

The release key 6 of the docking station 1 serves to initiate the removal of the notebook PC 3 from the docking station 1.

To make a mechanical connection between the notebook PC 3 and the docking station 1 the notebook PC 3 is placed on the base 2 and then latched by a mechanism not shown in detail. This also causes the notebook PC 3 to be connected with the computer connection 4 on the docking station 1.

As soon as the notebook PC 3 is connected to the docking station 1, data transfer can take place between the notebook PC 3 and the docking station 1 through the computer connection 4. In this way it is possible for the notebook PC 3 to use the functions of the docking station 1.

To initiate disconnection of the notebook PC 3 from the docking station 1 the user of the data processing system operates the release key 6. By operating the release key 6 a release signal is generated in the docking station 1. The release signal is transferred through the computer connection 4 to the notebook PC 3. This function is already available in the IBM docking station II.

The operating system of the notebook PC 3 is the IBM OS/2 operating system, Version 2.1. The receipt of the release signal in the notebook PC 3 causes the operating system of the notebook PC 3 to display a message to the user on the LCD screen of the notebook PC 3. The text of the message reads "Data in any Files not located on the ThinkPad will be lost if not closed or saved before undocking". By selecting "OK" the user can ensure that the data are saved or can ignore the message by choosing "Cancel".

The release lever 7 is normally locked by a locking screw. After securing the files a current is fed through a solenoid so that the locking screw moves into the removal position. This releases the release lever 7. By moving the release lever 7 in the direction of the arrow the connection between the notebook PC 3 and the docking station 1 is separated.

In the known state of the art IBM Docking Station II the current flows through the solenoid until the notebook PC is removed. If the removal of the notebook PC is effected only after some time, the current will flow through the solenoid for that period. This is a disadvantage in the docking station in accordance with the invention since the flow of current drains the battery in portable operation.

For this reason, in the docking station in accordance with the invention the solenoid is switched off after a predetermined time, e.g. 2 minutes, even if the removal of the notebook PC has not been effected within this period. In this case, the user of the data processing system from which he wants to remove the notebook PC, must press the release button 6 again. The current will then flow through the solenoid again for the same pre-determined time, so that the release lever 7 is released.

The docking station 1 can only be mains operated when stationary, but has a battery which allows portable operation. The notebook PC 3 likewise has a battery for mobile operation.

Figure 2:
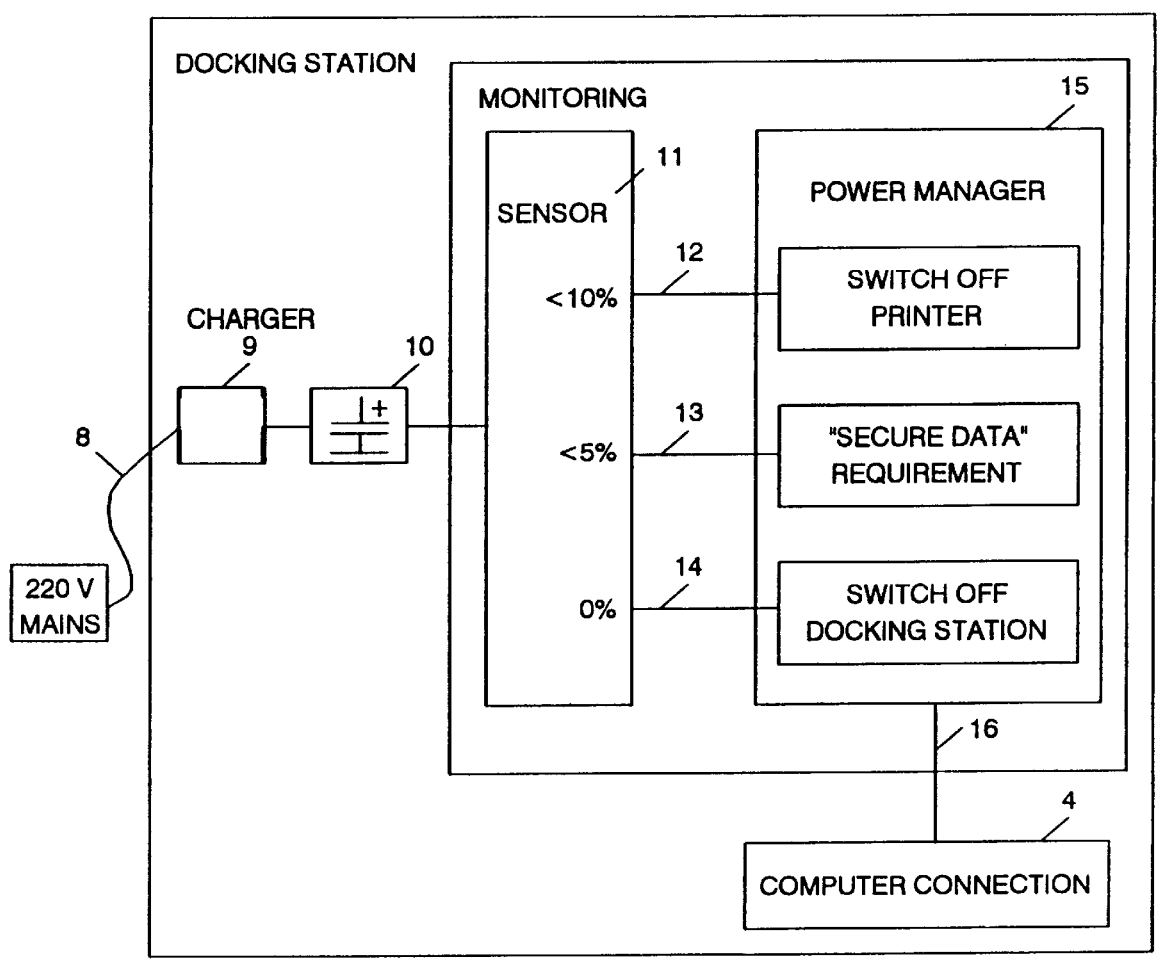
FIG. 2 is a block diagram of the monitoring of the charge level in the docking station in accordance with the invention.

The docking station in accordance with the invention shown in FIG. 2 has a cable 8 for connection to the mains power supply. This enables the battery 10 to be recharged through a charger 9.

The docking station also has means for monitoring the state of charge of the rechargeable battery 10. This consists primarily of a sensor 11 and a power manager 15. The sensor 11 measures the voltage of the rechargeable battery 10. In addition, the sensor 11 compares the measured voltage of the rechargeable battery 10 with predetermined threshold values. The first threshold value corresponds to 10% of the energy of the rechargeable battery in the fully charged state. The second threshold value corresponds to 5% of the energy of the rechargeable battery in the fully charged state.

If the sensor 11 determines that the value has fallen below the first threshold value a signal is sent to the power manager 15 through the lead 12. This causes the power manager 15 printer 18 belonging to the docking station 1 to be switched off. This serves to save the energy of the rechargeable battery 10.

With a further drop in the voltage of the rechargeable battery 10 to below the second threshold value, a signal is sent through the lead 13 of the sensor 11 to the power manager 15. The result of this is that the power manager 15 generates the release signal, which is transmitted over the lead 16 and the computer connection 4 to the notebook PC 3. The release signal corresponds to the release signal which is produced by actuating the release button of the known docking station.

On receipt of the release signal in the notebook PC 3, the OS/2 operating system, as mentioned, causes the message about the need to secure the data to be displayed. If this requirement is overridden by the user by selecting "Cancel", the display will repeat the message periodically, as long as the rechargeable battery voltage remains below the second threshold value of 5%. The interval may be about 2 minutes.

When the rechargeable battery voltage falls to 0, there is, of course, some residual energy remaining in the battery 17. This residual energy cannot, however, be withdrawn, without damaging the battery 17. In this case, a signal is consequently transmitted through the lead 14 from the sensor 11 to the power manager 15, the effect of which is to switch off the docking station. Before the docking station is switched off the user receives no further communication.

If the docking station is connected to the mains by way of the cable 8 after the rechargeable battery voltage falls below the first threshold value, the battery voltage 10 will increase again. After the 5% threshold value is exceeded, the sensor will no longer transmit any further signal through the lead 13, so that the periodic issuance of the disconnection signal by the power manager 15 through the lead 16 will cease.

In contrast to the known docking station II, the docking station 1 is built into a case. The shape of the housing of the docking station 1 is designed to fit the case. The case also contains the printer and other functional units which are connected to the docking station.

The docking station has additional logic which monitors the operation of the docking station release button 6. The additional logic has only a minimal energy consumption, which is of no significance in discharging the rechargeable battery 10. If the additional logic registers an operation of the release button, a switch will be closed for a pre-determined time, e.g. a few seconds or minutes, so that current flows through the solenoid. This will release the locking bolt and unlock the release lever. The notebook PC 3 can then be separated from the docking station 1.

What is claimed is:

1. A data processing system comprising:
   a first system unit,
   a second system unit capable of independent operation, and
   a data transfer connector forming a connection between said first and said second system unit, said first and second units capable of being temporarily coupled together,
   said first system unit having (a) an energy store device as a power supply and (b) a monitor monitoring the state of charge of said energy store, said second unit utilizing said energy store of said first unit when said first and second units are temporarily coupled together,
   said monitor responding to the state of charge of said energy store dropping below a threshold value by initiating disconnection of the connection between said first and said second system units, said second system being utilized during disconnection of said first and second systems.

2. A data processing system in accordance with claim 1, wherein said monitor transmits a signal when the state of charge of said energy store falls below the threshold value and the transmitted signal reaches said second system unit through said data transfer connector.

3. A data processing system in accordance with claim 2, wherein said second system unit has a receiver to receive the transmitted signal and a signal generator to transmit a requirement to the user of the data processing system to secure the data of the first system unit upon receipt of the signal.

4. A data processing system in accordance with claim 1, wherein the connection between the first and second system units can be separated while the second system unit is in the operating condition.

5. A data processing system in accordance with claim 1, wherein said first system unit is a docking station.

6. A data processing system in accordance with claim 1, wherein said first system unit is a mobile data transfer equipment.

7. A data processing system in accordance with claim 1, wherein said second system unit is a portable computer.

8. The system according to claim 1, further comprising said first system unit including a hard disk drive capable of storing data being processing by said second system unit, said second unit executing an application program utilizing said data stored on said hard disk drive.

9. The system according to claim 8, further comprising said first system including at least one computer peripheral device, wherein said at least one computer peripheral device utilizes said energy store of said first system unit as a source of power.

10. The system according to claim 9 further comprising means for disconnecting said energy store as a source of power for said at least one computer peripheral device when said energy store drops below a second threshold.

11. A system unit for use in a data processing system comprising:
    a data transfer connector defining a connection between said system unit and a second system unit, wherein said system unit and said second system unit capable of independent operation are capable of being temporarily coupled together,
    an energy store device serving as a power supply for both said system unit and said second system unit when said system unit and said second system unit are temporarily coupled together, and
    a monitor monitoring the state of charge of said energy store,
    said monitor responding to the state of charge of said energy store dropping below a threshold value by initiating disconnection of the temporary connection between said system unit and the second system unit, said second system being utilized during disconnection of said first and second systems.

12. A system unit in accordance with claim 11, wherein said monitor transmits a signal when the state of charge of said energy store falls below the threshold, the signal being transmitted through said connector to the second system unit.

13. A system unit in accordance with claim 11, wherein the disconnection of the connection can be initiated by the user and the system unit comprises an input receiving a user requirement for the disconnection of the connection.

* * * * *